W. W. DOUGLAS AND S. L. BAILEY.
SIGHT FEED LUBRICATOR.
APPLICATION FILED MAY 12, 1919.
1,346,942.
Patented July 20, 1920.
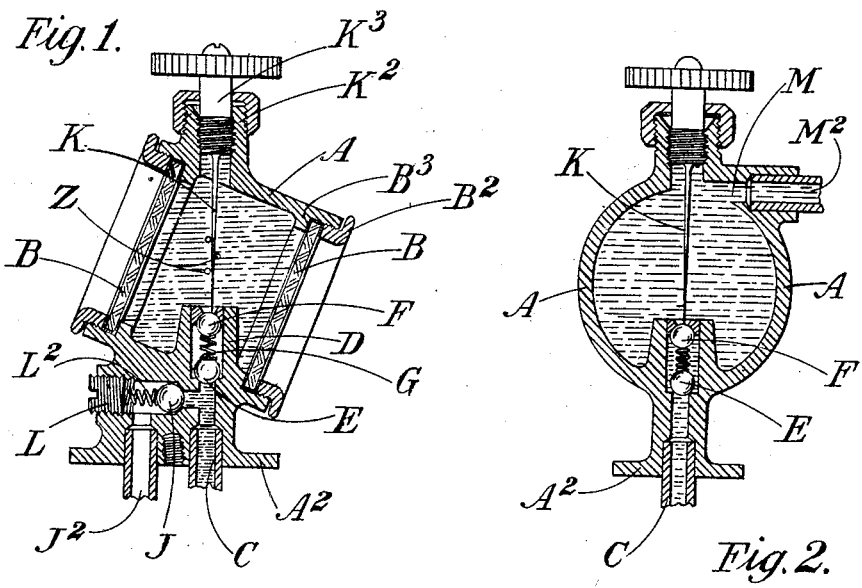
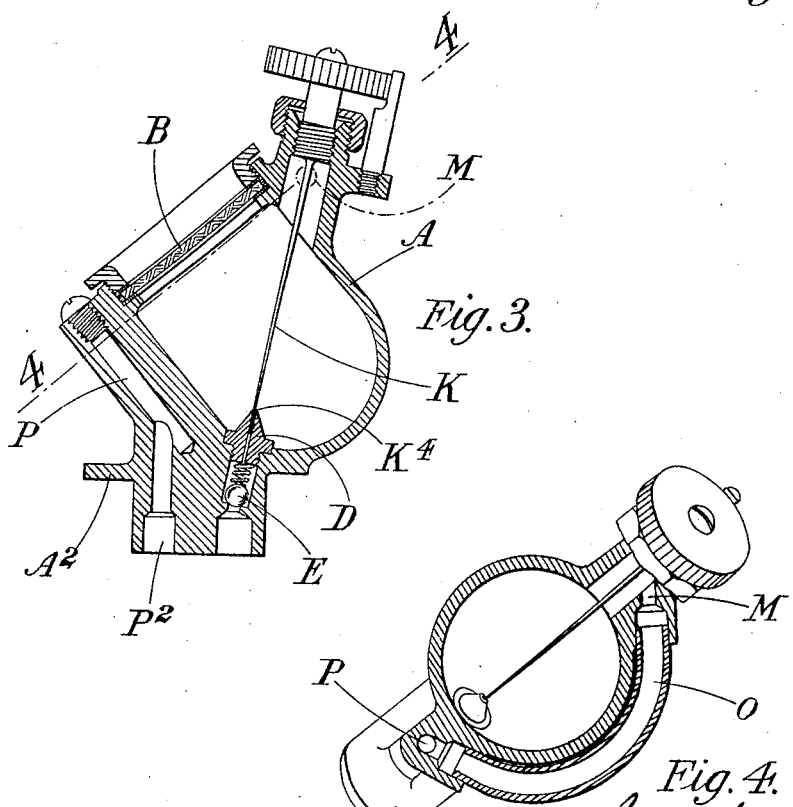
Inventors:
William Wilson Douglas
and Stephen Leslie Bailey

UNITED STATES PATENT OFFICE.

WILLIAM WILSON DOUGLAS AND STEPHEN LESLIE BAILEY, OF BRISTOL, ENGLAND.

SIGHT-FEED LUBRICATOR.

1,346,942.　　　　　Specification of Letters Patent.　　Patented July 20, 1920.

Application filed May 12, 1919. Serial No. 296,365.

*To all whom it may concern:*

Be it known that we, WILLIAM WILSON DOUGLAS and STEPHEN LESLIE BAILEY, subjects of the King of England, residing at Bristol, in the county of Gloucester, England, have invented certain new and useful Improvements in Sight-Feed Lubricators, of which the following is a specification.

This invention is for improvements in sight-feed lubricators, of the type in which oil is supplied to the regulating-valve under pressure, the discharge orifice of the valve being situated in a sight-feed chamber intermediate of the oil supply and the part to be lubricated. Usually the oil is delivered to the upper part of the chamber, whence it falls by gravity to the lower part and thence passes by a conduit to the part to be lubricated. In such an arrangement any obstruction in the outflow pipe causes the chamber to fill with oil so that the rate of oil feed cannot be seen, and if the conditions subsequently become normal, some of the oil remains upon and obscures the window of the chamber.

This invention has for its principal object to prevent the possibility of the chamber becoming filled with oil, by maintaining the oil under pressure throughout the whole of its passage from the regulating valve to the part to be lubricated. The means employed for this purpose also prevent the oil splashing the window in the chamber through vibration or like causes.

In the accompanying drawings,

Figure 1 is a vertical section through one form of lubricator embodying this invention and suitable for use on a motor-cycle.

Fig. 2 is a transverse section of the same.

Fig. 3 is a vertical section of a modification and

Fig. 4 a horizontal section on the line 4—4 of Fig. 3.

Like letters indicate like parts throughout the drawings.

In the construction shown in Figs. 1 and 2 the sight-feed chamber A consists of barrel-shaped member the ends of which are provided with glass windows B secured liquid tight therein by screwed glands B³ and B³. The chamber is provided with a base A² which is so disposed that the axis of the chamber is inclined to the horizontal, for example at about 30°, when the chamber is mounted on the motor-cycle.

The oil is supplied by a pressure pump (not shown) or gravity, and enters the chamber A by a conduit C in the base thereof. The conduit communicates with the orifice of a nozzle D extending vertically into the chamber A for about one third of its height. Within the nozzle are two ball-valves, the lower E of which seats downwardly to form a non-return valve to the oil conduit, and the upper F seats upwardly to close the outlet orifice and constitute the regulating-valve. A coil spring G between and bearing upon the two valves, presses each on its seat. Beneath the lower valve a lateral conduit communicates with an overflow pipe J² to the oil tank by way of a spring-pressed non-return ball-valve J, held to its seat by a spring L², adjustable by a screw-plug L and constituting a by-pass or relief valve.

Projecting into and having threaded connection with the upper part of the chamber A immediately above the oil-nozzle D is a vertically-disposed spindle K, K², K³, the lower end of which bears upon the upper ball-valve F in the nozzle to regulate its opening at will. The spindle is provided with an index head and is made pressure-tight where it enters the chamber, by means of a stuffing box and gland at K².

At the highest part of the interior of the chamber is a lateral outlet M to which is connected the oil-outflow conduit M².

In use, the chamber is filled with water to a height just below the level of this outflow-conduit M and the water is introduced therein by removal of the screwed spindle K, the upper portion K³ of which is of enlarged diameter to provide a suitably sized aperture for this purpose.

The action of the sight-feed lubricator is as follows:—With the regulating valve F closed, oil delivered by the pump cannot enter the sight-feed chamber but returns to the tank by way of the by-pass valve and overflow conduit J, J². On opening the regulating valve by means of the screwed spindle K, oil issues from the nozzle orifice D and by reason of its lower specific gravity rises through the water as a series of beads as shown at Z or in a continuous stream, any excess supplied returning as before to the tank. As the oil rises toward the outflow pipe M² it clings to and is guided by the regulating spindle K which for this purpose is made of relatively small diameter. It will be apparent that the water will be subjected to pressure when the regulating valve F is opened, and this pressure will be transmitted to the oil in the outflow-pipe M². Any obstruction in the outflow-pipe would cause the pressure so to increase in the sight-feed chamber that the oil flow from the orifice would cease, and the oil delivered by the pump would then return to the tank past the by-pass valve J. The by-pass valve may be provided with means, (such as the screwed abutment L for its spring L²) to vary the load upon it, thereby to vary the pressure at which the oil is delivered to the parts to be lubricated.

In the modified form shown in Figs. 3 and 4 the chamber A is provided on one side only with a transparent face B, the interior of the chamber being suitably painted white to render the interior visible.

The lower end of the regulating spindle K is tapered as at K⁴, and this tapered portion coöperates with the mouth of the nozzle D to form a needle valve for regulating the flow.

The oil outlet M communicates by passages O and P with the outlet pipe, which would be connected at P².

Water is prevented from draining out of the chamber into the oil pipe by the lower non-return valve E into the nozzle, when the pressure supply ceases.

It will be appreciated that any transparent liquid other than water might be used in the sight-feed chamber provided its specific gravity was greater than that of the oil.

What we claim as our invention and desire to secure by Letters Patent is:—

1. In a sight feed lubricator, the combination of an inclined chamber provided with a glass end, an inlet for oil in the lowest part of said chamber, a nozzle projecting into said chamber from said inlet, a non-return valve in said inlet, a regulating valve in said nozzle, a spring tending to keep both said valves closed, a spindle having an adjustable engagement with the chamber wall opposite said nozzle and arranged to control said regulating valve, and an outlet in the highest part of the chamber.

2. In a sight feed lubricator, the combination of a chamber having a transparent wall, an oil inlet in the bottom of said chamber, a non-return valve and a regulating valve in said inlet, a spring tending to hold both said valves seated, a screw spindle in said chamber wall above said inlet and having a tapered point adapted to open said regulating valve, an outlet in the top of said chamber and a by-pass below said non-return valve.

3. In a sight feed lubricator, the combination of an inclined cylindrical container having an upwardly projecting nozzle in its lowest part, a spring pressed regulating valve in said nozzle, a check valve in said nozzle below said regulating valve, a branch by-pass below said check valve, a check valve in said by-pass, and a spindle screw-threaded in the wall of said container in line with said nozzle and adapted to contact with said regulating valve to open it and to form a guide for the oil as it rises through said chamber.

4. A sight feed lubricator, comprising an inclined cylindrical vessel having transparent ends, an oil inlet nozzle projecting up from the lower wall of the vessel, a spindle threaded in the wall of the vessel above said nozzle, a pair of ball valves in said nozzle, a spring between said valves to hold them both seated, a point on said spindle adapted to open the uppermost of said valves and to form a guide for the oil as it rises through the liquid in the vessel, and a by-pass below the valves in the nozzle arranged to come into action at a predetermined pressure.

In testimony whereof we have signed our names to this specification in the presence of two subscribing witnesses.

WILLIAM WILSON DOUGLAS.
STEPHEN LESLIE BAILEY.

Witnesses:
ALFRED H. HARRISON,
F. C. DUNN.